(12) United States Patent
Wong

(10) Patent No.: US 11,266,199 B2
(45) Date of Patent: Mar. 8, 2022

(54) SAFETY HELMET ACCESSORY SYSTEM

(71) Applicant: Klein Tools, Inc., Lincolnshire, IL (US)

(72) Inventor: Kingston T. Wong, Beach Park, IL (US)

(73) Assignee: Klein Tools, Inc., Lincolnshire, IL (US)

( * ) Notice: Subject to any disclaimer, the term of this patent is extended or adjusted under 35 U.S.C. 154(b) by 233 days.

(21) Appl. No.: 16/385,962

(22) Filed: Apr. 16, 2019

(65) Prior Publication Data

US 2020/0329806 A1 Oct. 22, 2020

(51) Int. Cl.
| A42B 3/28 | (2006.01) |
| F04D 25/06 | (2006.01) |
| A42B 3/04 | (2006.01) |
| H01M 50/10 | (2021.01) |

(52) U.S. Cl.
CPC ............ *A42B 3/286* (2013.01); *A42B 3/0406* (2013.01); *F04D 25/0673* (2013.01); *H01M 50/10* (2021.01)

(58) Field of Classification Search
CPC ... A42B 3/286; A42B 3/0406; F04D 25/0673; H01M 50/10
See application file for complete search history.

(56) References Cited

U.S. PATENT DOCUMENTS

| 4,238,857 | A | * | 12/1980 | Waters | ................... | A42B 3/285 |
| | | | | | | 2/171.3 |
| RE33,286 | E | * | 8/1990 | Waters | .................... | A42C 5/04 |
| | | | | | | 2/171.3 |
| 5,425,620 | A | * | 6/1995 | Stroud | ................... | A42B 1/008 |
| | | | | | | 416/63 |
| 5,577,495 | A | * | 11/1996 | Murphy | ................. | A42B 3/225 |
| | | | | | | 128/201.22 |
| D617,396 | S | * | 6/2010 | Nielsen | ........................ | D21/500 |
| 2011/0231977 | A1 | * | 9/2011 | Rupnick | ................ | A42B 3/286 |
| | | | | | | 2/7 |
| 2011/0318197 | A1 | * | 12/2011 | Huber | ................. | F04D 25/0673 |
| | | | | | | 417/234 |

* cited by examiner

Primary Examiner — Patrick Hamo

(57) ABSTRACT

A multiple component system is provided for mounting on a safety helmet and includes a first component housing carrying a first component, and a second component housing carrying a second component. Each housing has a first mount connector and a second mount connector located on opposing faces of the housing. The first mount connectors are configured to be compatible with the second mount connectors to provide quick release mount connections between the housings.

24 Claims, 10 Drawing Sheets

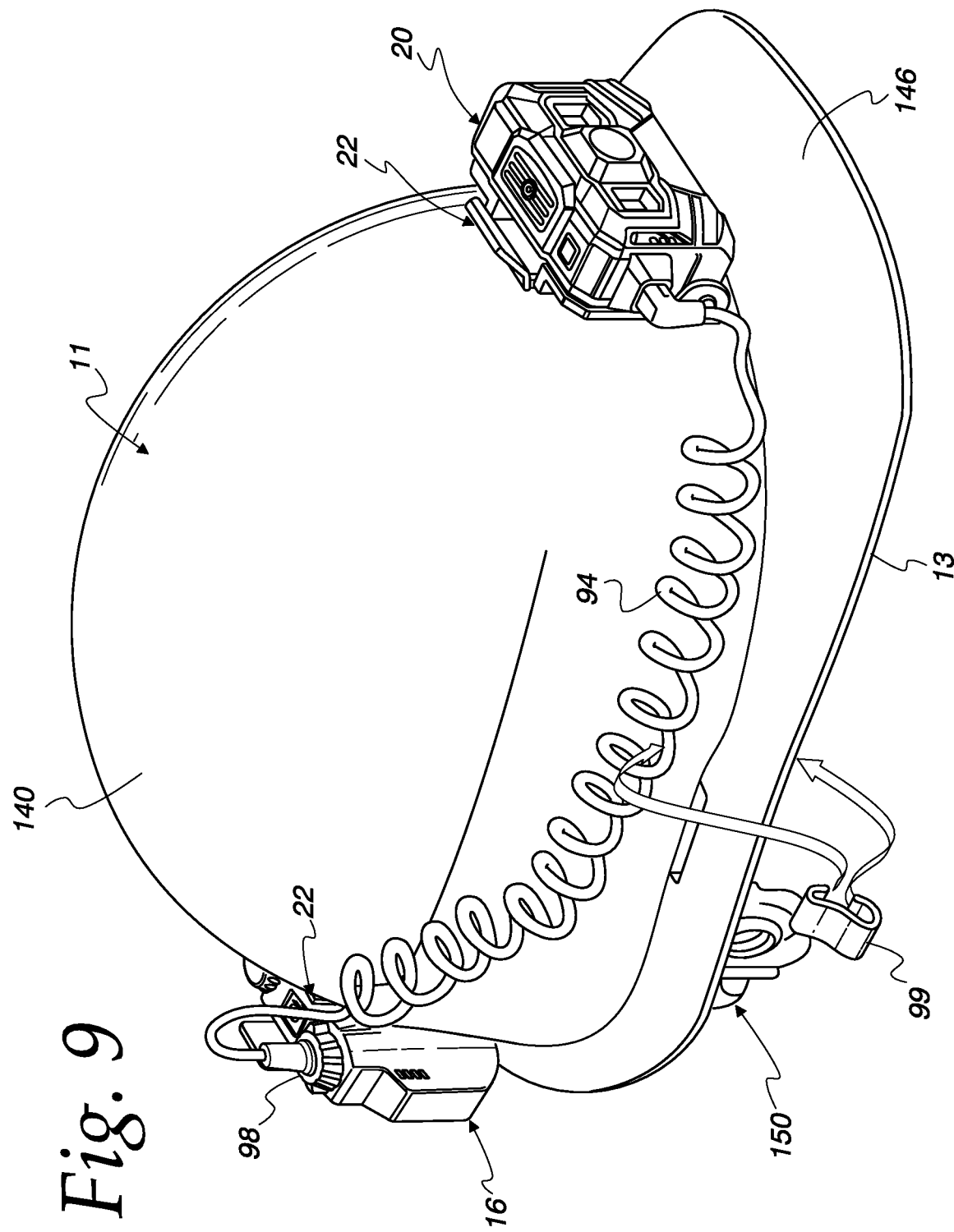

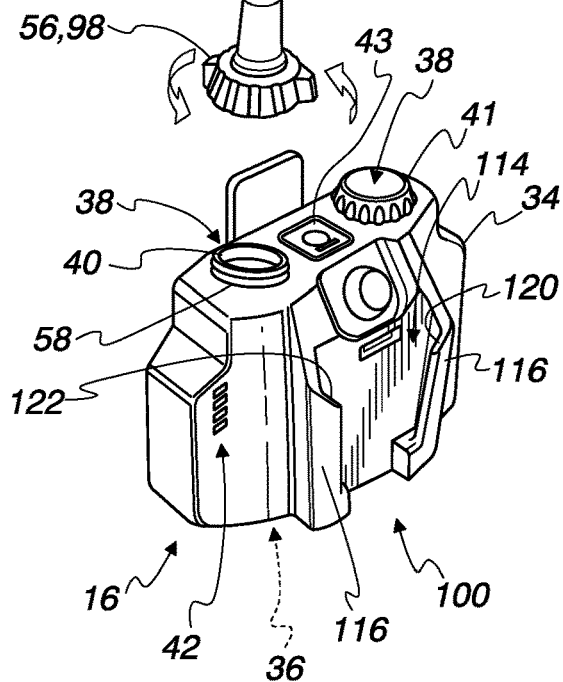
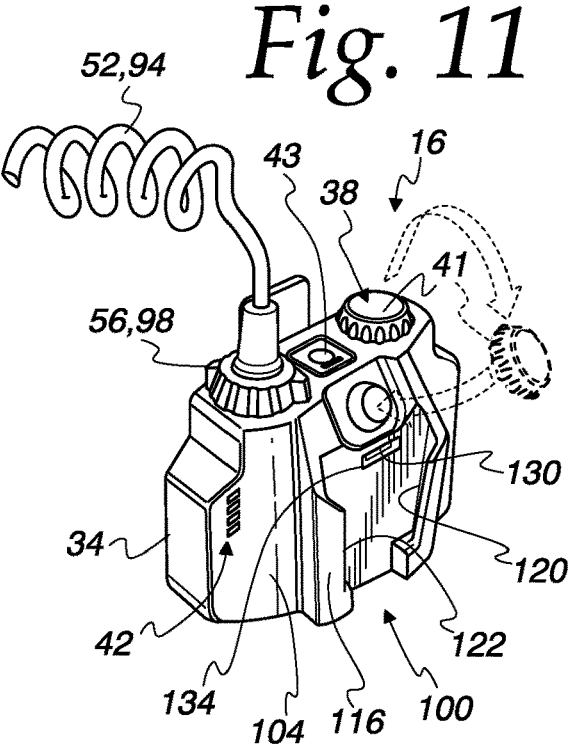
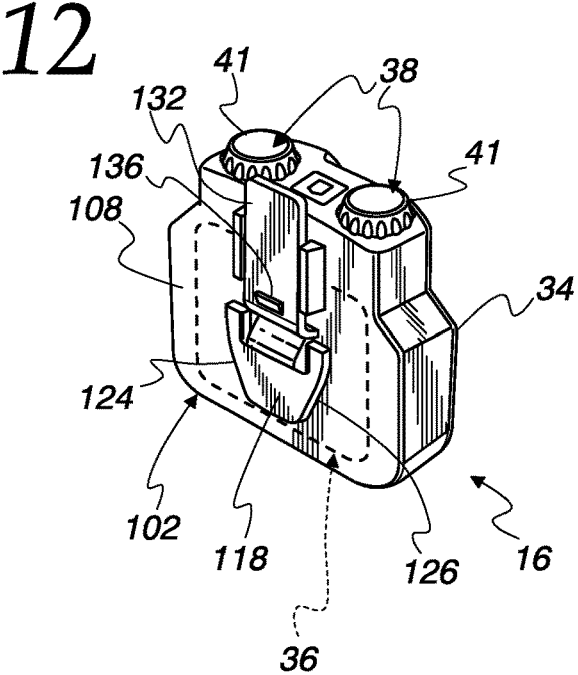

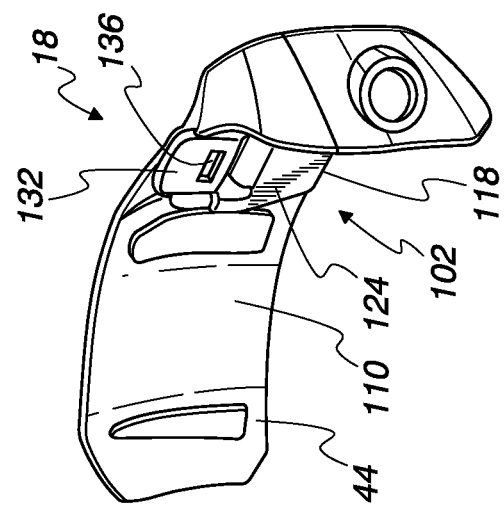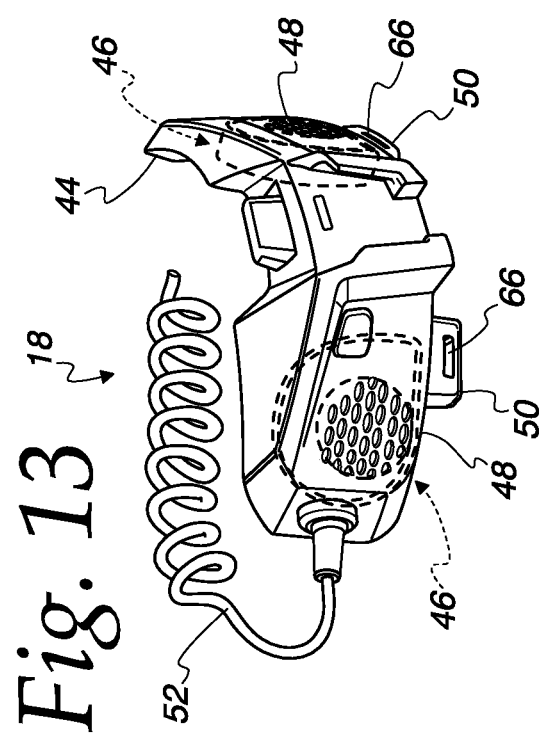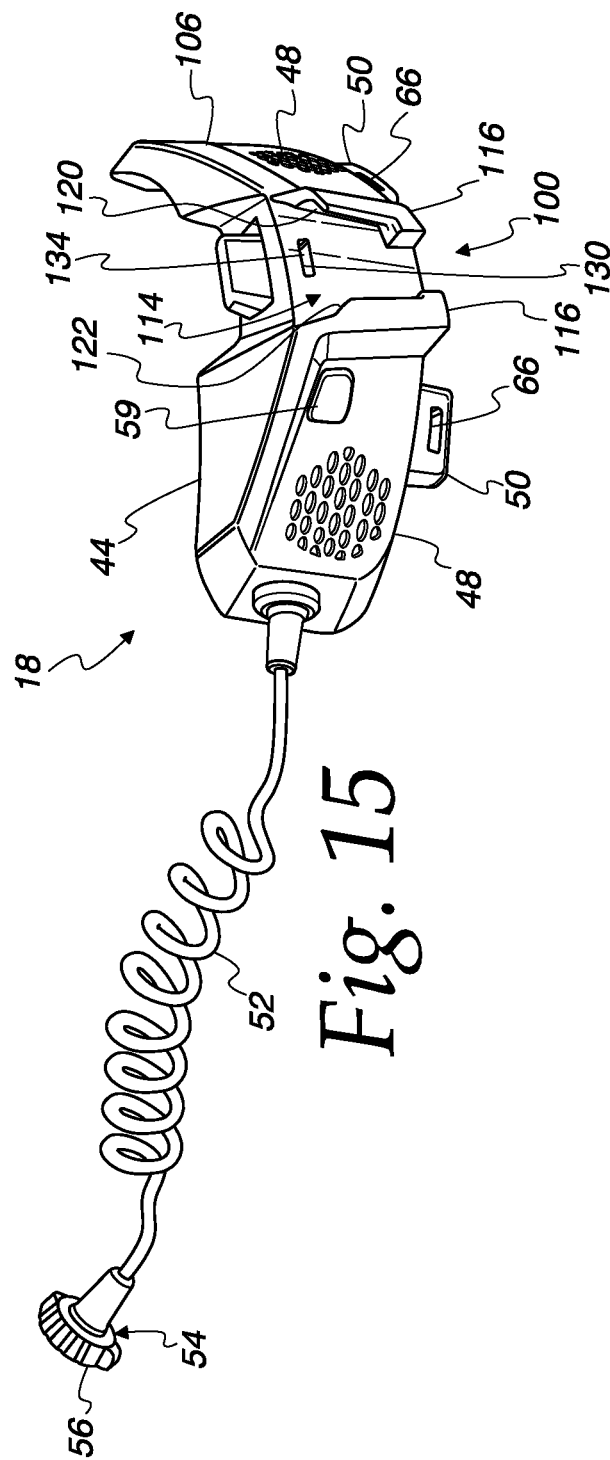

SAFETY HELMET ACCESSORY SYSTEM

CROSS-REFERENCE TO RELATED APPLICATIONS

None

BACKGROUND OF THE DISCLOSURE

The present disclosure relates to personal protection devices and, more particularly, safety helmets for use to protect the wearer from falling objects, commonly referred to as "hard hats", and to accessories for such helmets. Various types of safety helmets are commonly used in several industries, many of which include mounted accessories, with personal illumination devices commonly called headlamps, typically powered by a direct current power source (either replaceable or rechargeable chemical cells), being by far the most commonly mounted accessory. In the simplest of such devices, the headlamp is permanently mounted to the safety helmet in a fixed orientation at the front of the safety helmet. In other such devices, a mounting bracket is included at the front of the helmet to allow for a headlamp to be inserted. Cooling fans are another accessory that have been mounted to safety helmets, but they are far less common than headlamps.

One common method of mounting headlamps or other accessories onto a safety helmet is by using an elastic band to conform and adhere to the exterior of the safety helmet, and then mounting the portable device onto the elastic band. While use of elastic bands can permit mounting of the headlamp or other accessory at any orientation relative to the safety helmet, and also mounting of additional devices onto a single band, switching between orientations can be difficult. It is also known to use other types of bands to mount accessories to safety helmets, but all, or almost all, band-type mounting systems are prone to slippage relative to the helmet, including to slipping off from the safety helmet, especially when lubricating fluids may fall on the helmet and enter the interface between the helmet's exterior and the band, thus requiring constant readjustment by the user.

Another common issue with known safety helmet headlamp arrangements and other powered accessories is the connection of a power source to the headlamp or other powered accessory. Portable power sources such as batteries are known to be heavy and bulky. When integrated with the headlamp, which is worn on the front facing side of the helmet, headlamps with integrated power sources tend to pull the helmet down, especially when the wearer is looking down. To reduce the weight of headlamps, manufacturers decrease the size of the batteries that are integrated therewith, which also decreases their useful life and will also decrease the lumen output of the headlamp. In certain applications where long life and/or higher power or light intensity is desired, headlamps and other accessories are often connected to a power source via a wire that connects to heavier and bulkier batteries worn around the user's waist. The wire leading to the batteries, however, can present a nuisance to the user and also increases the chances of unsafe conditions as it may become snagged as the user is moving around.

Specifically, with regards to fans, it is known to integrate fans into the shell of the hard hat, but such constructions require that the fan unit, including its weight and bulk, always be worn by the user, even in conditions that do not require fan cooling. It is also known to utilize bands or brackets or fasteners to mount a fan unit to the hard hat shell, but such mount schemes often require a user to make multiple adjustments or to manipulate multiple threaded fasteners to mount the fan to the hard hat. Similar issues arise in systems that mount a fan to the strap/suspension system of a hard hat, and additionally may interfere with the functionality and performance of the strap/suspension system and/or the hard hat. The ability to accommodate different brim configurations is another challenge that arises with fan systems that are intended to be removably mounted to a hard hat to allow use with different hard hats.

A lack of flexibility in where an accessory or a plurality of accessories can be mounted and/or the arrangement of those accessories relative to each other are additional challenges that arises with the mounting of any type of accessory on a safety helmet.

BRIEF SUMMARY OF THE DISCLOSURE

In accordance with one feature of this disclosure, a safety helmet fan system is provided and includes a motor driven fan, a fan housing carrying the motor driven fan, a battery to power the motor driven fan, and a battery housing carrying the battery. The fan housing has a pair of opposing faces, a first connector located on one of the opposing faces and a second connector located on the other of the opposing faces. The battery housing has a pair of opposing faces, a first connector located on one of the opposing faces of the battery housing and a second connector located on the other of the opposing faces of the battery housing. The first connectors are configured to be compatible with the second connectors to provide quick release mount connections between the fan housing and battery housing on each of their opposing faces.

According to one feature of this disclosure, a multiple component system is provided for mounting on a safety helmet and includes a first component housing carrying a first component, and a second component housing carrying a second component. Each housing has a first mount connector and a second mount connector located on opposing faces of the housing. The first mount connectors are configured to be compatible with the second mount connectors to provide quick release mount connections between the housings.

In one feature the first connectors are configured to be compatible with one or more mount connectors on a safety helmet to provide quick release mount connections between the housings and the safety helmet.

In another feature, the safety helmet fan system further includes a safety helmet shell having a pair of mount connectors, with each mount connector being configured to receive either of the first connectors to provide quick release mount connections between the safety helmet shell and the housings.

As one feature, each of the first connectors includes a male feature and each of the second connectors includes a female feature configured to receive the male feature.

In a further feature, either each of the first connectors or each of the second connectors includes a spring tab with a lock feature that is engageable with a mating lock feature to restrict relative movement between the connectors when a male feature is engaged with a female feature.

As yet a further feature, the lock feature is a tooth and the mating lock feature is a shoulder configured to engage the tooth.

In another feature, the male feature includes a flange and the female feature includes a groove configured to receive the flange.

As further feature, the male feature includes a pair of oppositely directed flanges and the female feature includes a pair of grooves, each groove configured to receive one of the flanges.

In accordance with one feature of this disclosure, a safety helmet fan system is provided and includes a motor driven fan, a fan housing carrying the motor driven fan, a battery, and a battery housing carrying the battery. The fan housing has a male mount connector and a female mount connector located on opposing faces of the fan housing, and the battery housing has a male mount connector and a female mount connector located on opposing faces of the battery housing. The male mount connectors are configured to be compatible with the female mount connectors to provide quick release mount connections between the fan housing and the battery housing on each of their opposing faces.

As one feature, at least one of the male mount connectors or the female mount connector are configured to be compatible with one or more mount connectors on a safety helmet to provide quick release mount connections between the housings and the safety helmet.

In another feature, the system further includes a safety helmet shell having a pair of mount connectors, each mount connector on the safety helmet shell configured to receive at least one of the male mount connectors or female mount connectors to provide quick release mount connections between the safety helmet shell and the housings.

In one feature, each of the male mount connectors includes a spring tab with a lock feature that is engageable with a mating lock feature on each of the female mount connectors to restrict relative movement between the mount connectors when a male mount connector is engaged with a female mount connector.

As a further feature, the lock feature is a tooth and the mating lock feature is a shoulder configured to engage the tooth.

According to one feature, each of the male mount connectors includes a flange and each of the female mount connectors includes a groove configured to receive the flange.

In one feature, each of the male mount connectors includes a pair of oppositely directed flanges and each of the female mount connectors includes a pair of grooves, with each groove being configured to receive one of the flanges.

In accordance with one feature of the invention, a multiple component, battery powered system is provided for mounting on a safety helmet. The system includes a battery housing carrying a battery, a first component housing carrying a first component that can be powered by the battery, and a second component housing carrying a second component that can be powered by the battery. The battery housing has a male mount connector and a female mount connector located on opposing faces of the battery housing. The first component housing has a male mount connector and a female mount connector located on opposing faces of the first component housing. The second component housing has at least one of a male mount connector or a female mount connector. The male mount connectors are configured to be compatible with the female mount connectors to provide quick release mount connections between the housings.

According to one feature, at least one of the male mount connectors or the female mount connectors are configured to be compatible with one or more mount connectors on a safety helmet to provide quick release mount connections between the housings and the safety helmet.

As one feature, the multiple component, battery powered system further includes a safety helmet shell having a pair of mount connectors, each mount connector on the safety helmet shell configured to receive at least one of the male mount connectors or female mount connectors to provide quick release mount connections between the safety helmet shell and the housings.

In one feature, each of the male mount connectors or each of the female mount connectors includes a spring tab with a lock feature that is engageable with a mating lock feature to restrict relative movement between the mount connectors when a male mount connector is engaged with a female mount connector.

According to one feature, each of the male mount connectors includes a flange and each of the female mount connectors includes a groove configured to receive the flange.

In accordance with one feature of this disclosure, a battery powered system is provided for mounting on a safety helmet. The system includes a battery housing carrying a battery, and a first component housing carrying a first component that can be powered by the battery. The battery housing has a first mount connector and a second mount connector located on opposing faces of the battery housing. The first component housing has a first mount connector and a second mount connector located on opposing faces of the first component housing. The first mount connectors are configured to be compatible with the second mount connectors to provide quick release mount connections between the housings.

In one feature, the battery powered system further includes a second component housing carrying a second component that can be powered by the battery. The second component housing has a first mount connector configured to be compatible with the second mount connectors to provide quick release mount connections between the housings.

As one feature, the first mount connectors are male mount connectors and the second mount connectors are female mount connectors.

According to one feature, the battery powered system further includes a safety helmet shell having a pair of mount connectors, each mount connector configured to receive either of the first connectors to provide quick release mount connections between the safety helmet shell and the housings.

BRIEF SUMMARY OF THE SEVERAL VIEWS OF THE DRAWINGS

FIG. 9 is a front perspective view of the safety helmet of FIGS. 2, 7 and 8, showing another possible mount arrangement of selected components of the system of FIG. 1.

FIGS. 10 and 11 are a front perspective views of a battery pack of the system of FIG. 1 illustrating the connection of a power cable to the battery pack.

FIG. 12 is a rear perspective view of the battery pack of FIGS. 10 and 11.

FIG. 13 is a front perspective view of a fan unit of the system of claim 1.

FIG. 14 is a rear perspective view of the fan unit of FIG. 13.

FIG. 15 is another front perspective view of the fan unit of FIGS. 13 and 14.

DETAILED DESCRIPTION OF PREFERRED EMBODIMENTS

Figure 1:
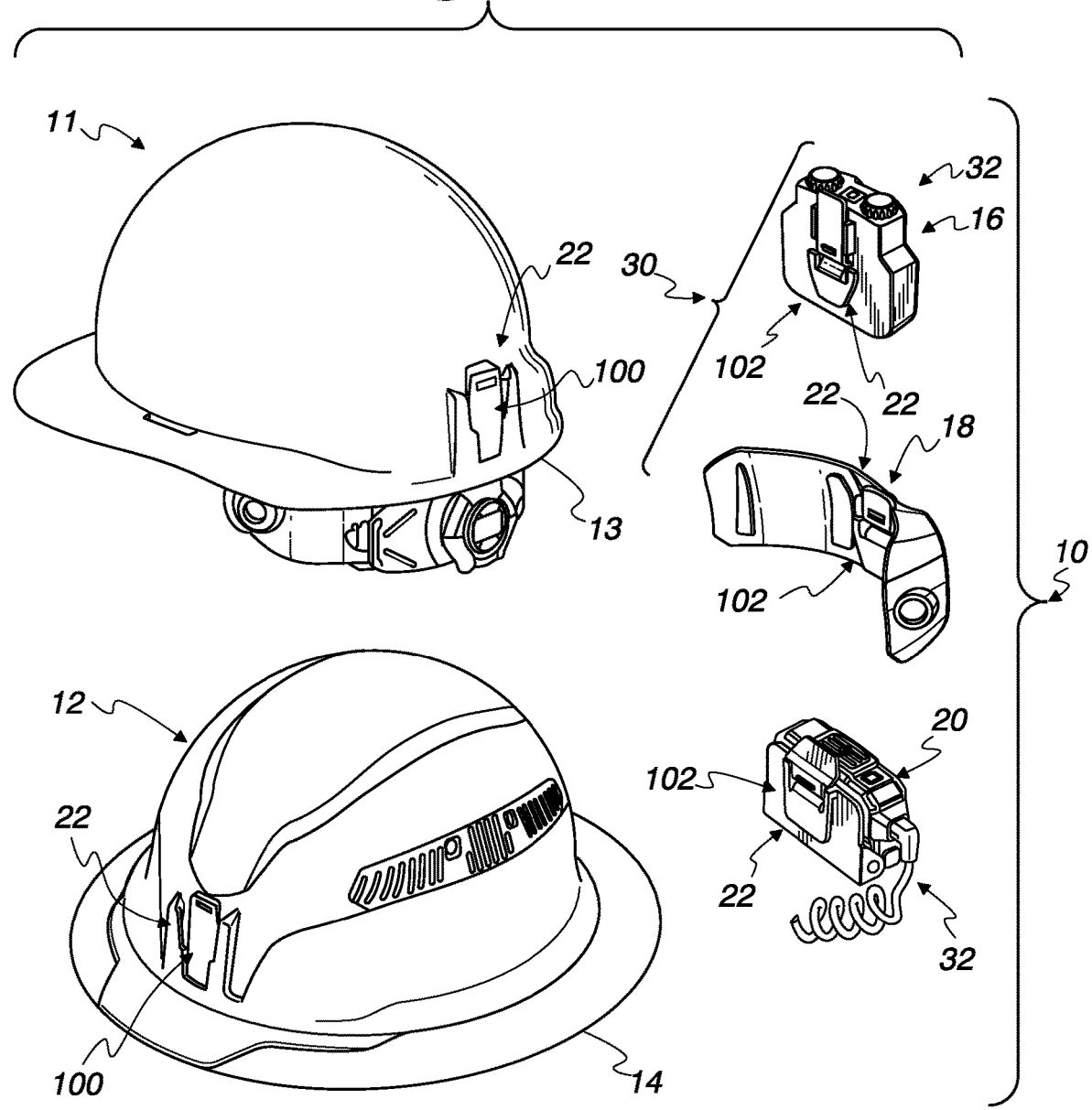
FIG. 1 is a view showing a battery powered system that can be selectively mounted to a variety of safety helmets, with two examples of such helmets shown in FIG. 1.
Figure 2:
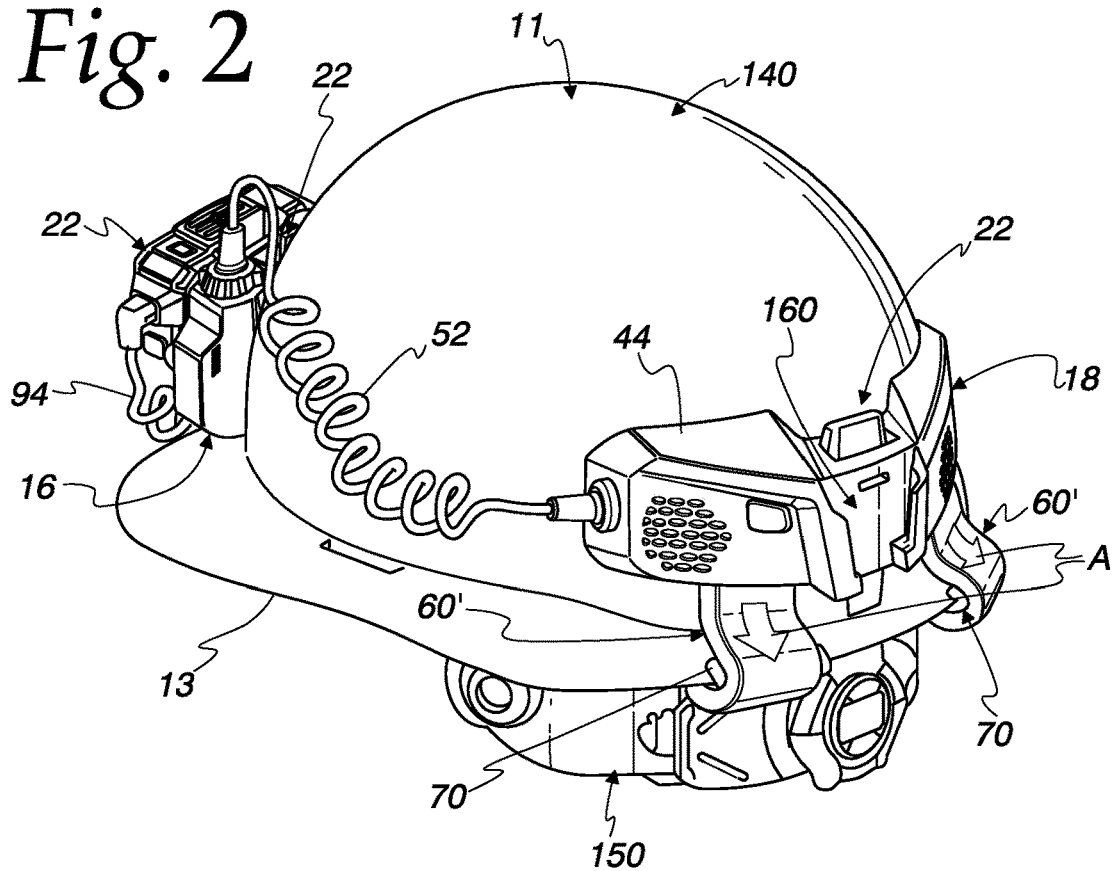
FIG. 2 is a rear perspective views of the system of FIG. 1 mounted on a safety helmet.
Figure 3:
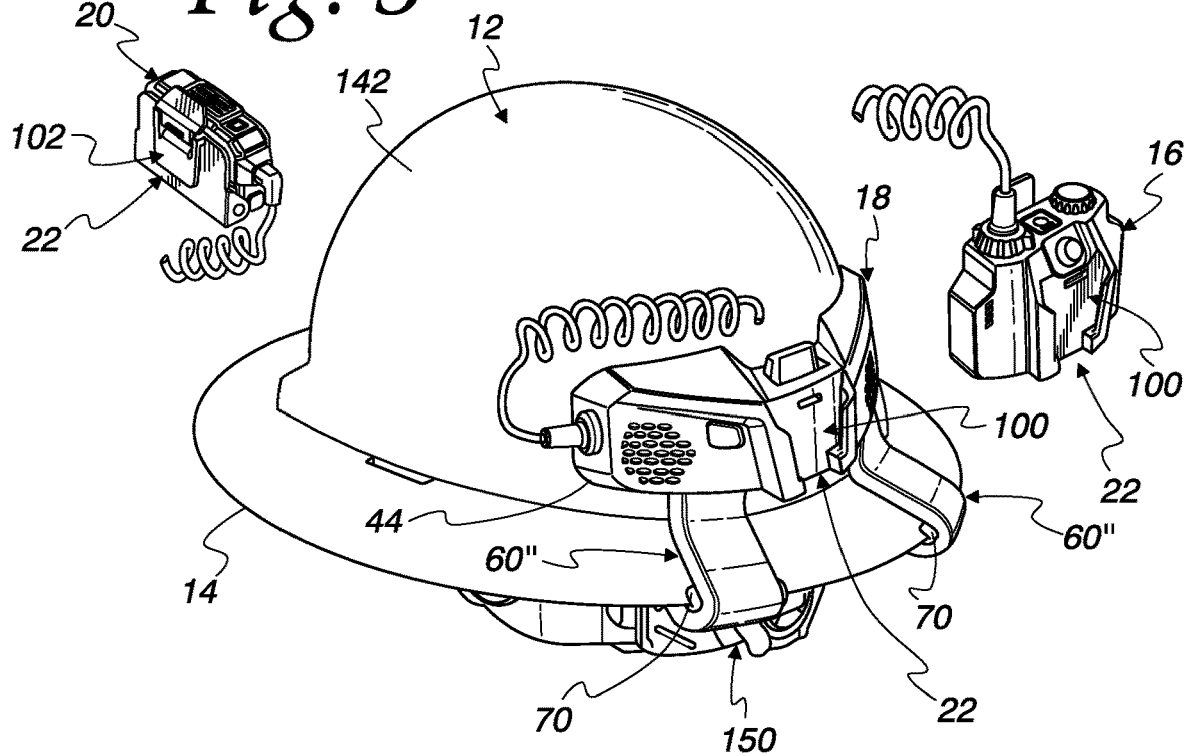
FIG. 3 is a rear perspective view showing a portion of the system of FIG. 1 mounted on another safety helmet, with the remainder of the system dismounted for purposes of illustration.
Figure 4:
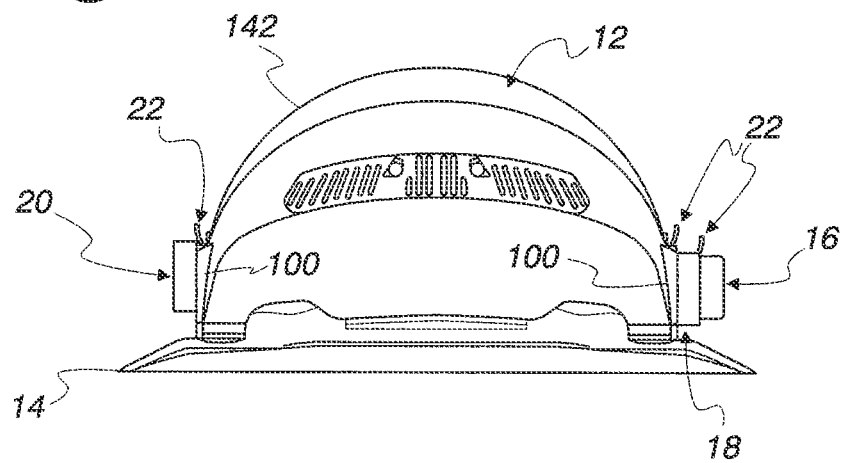
FIGS. 4-6 are side views of a safety helmet illustrating a variety of possible arrangements for mounting the components of the system of FIG. 1 onto the safety helmet.

As best seen in FIGS. 1-3, a multiple component, battery powered system 10 is provided for selectively mounting to safety helmets 11 and 12 having different brim configurations 13 and 14, respectively. In the illustrated embodiment, the system 10 includes a power storage component in the form of a power or battery pack 16, a cooling component in the form of a fan unit 18 configured to be powered by the battery pack 16, and an illumination component in the form of a headlamp 20 that is also configured to be powered by the battery pack 16, with each of the components 16, 18 and 20 being selectively connectable to each other and to the helmets 12 and 14 by quick release mount connections shown generally at 22. In combination, the battery pack 16 and fan unit 18 form a cooling fan system 30 for the helmets 12 and 14. Similarly, in combination, the battery pack 16 and the headlamp 20 form a headlamp system 32 for the helmets 12 and 14.

Figure 7:
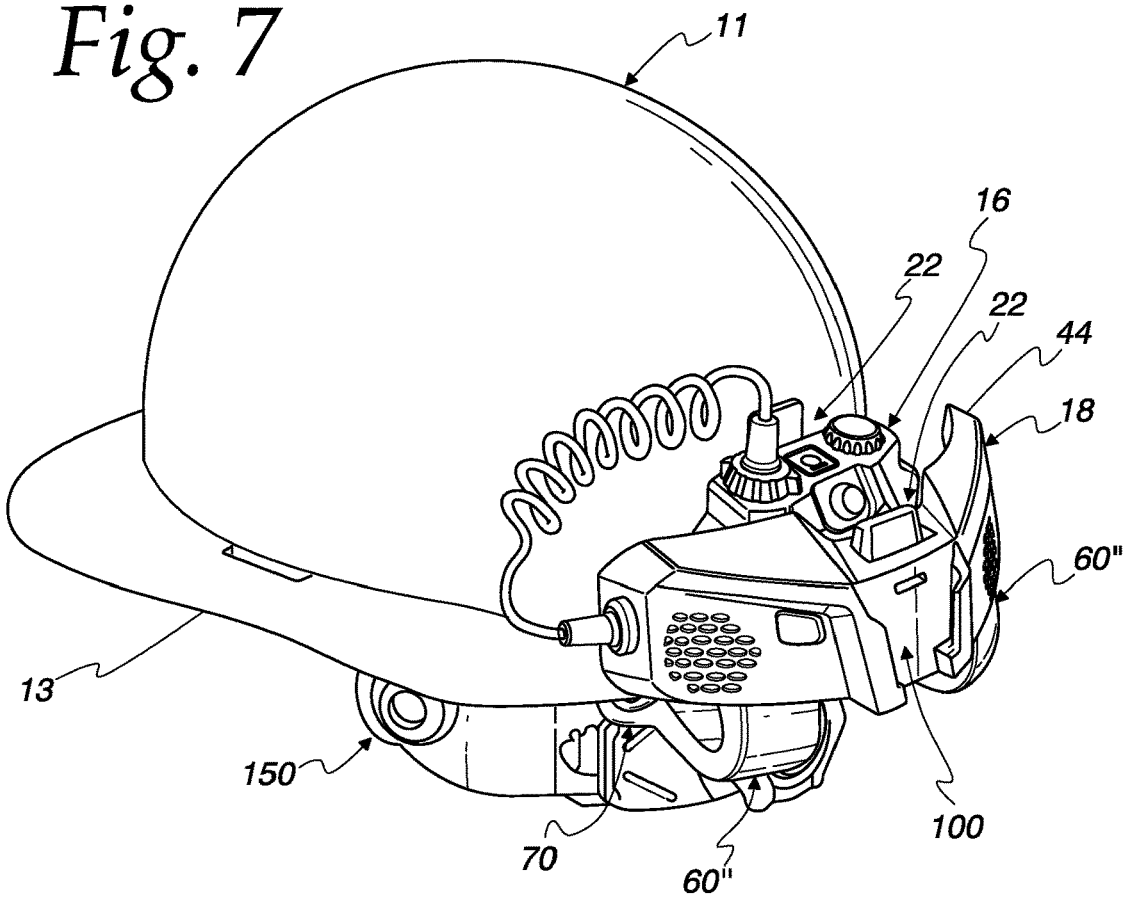
FIGS. 7 and 8 are views similar to FIG. 2, but showing other possible mount arrangement of selected components of the system of FIG. 1.
Figure 8:
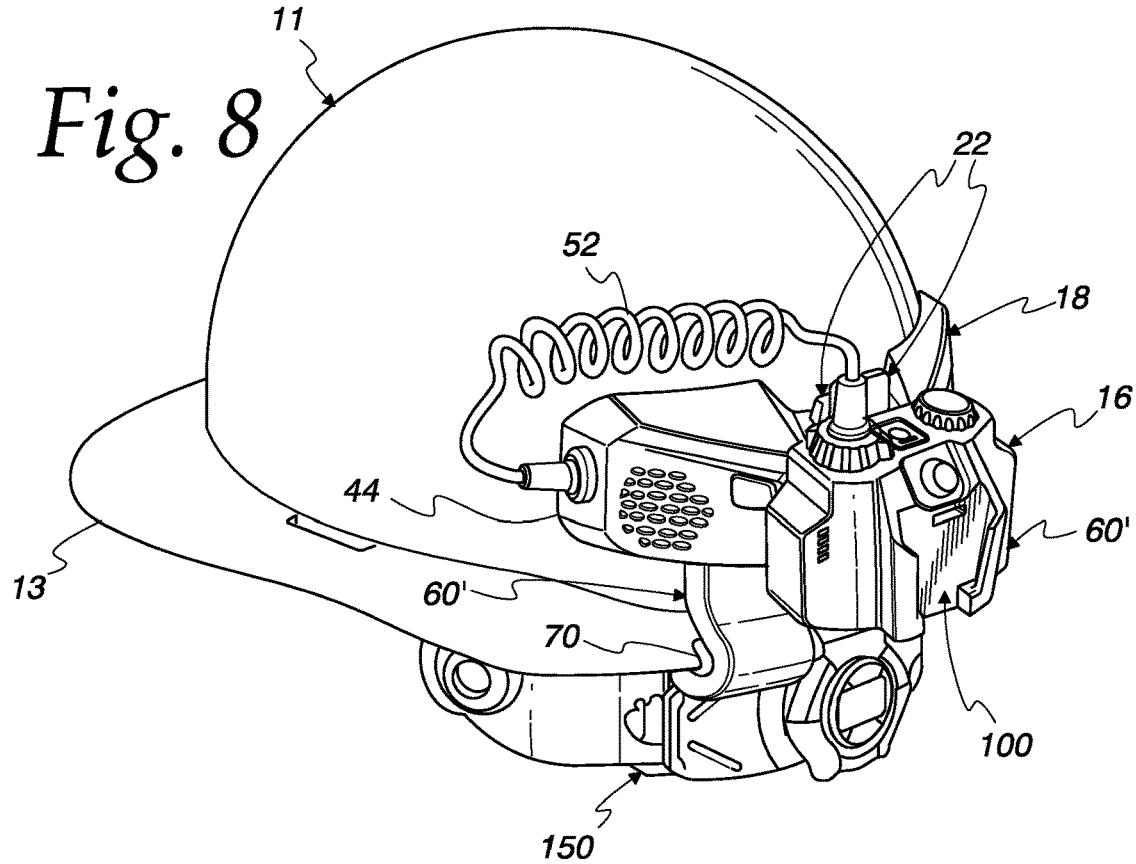
Figure 16:
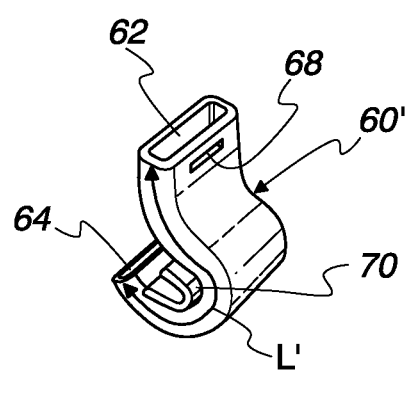
FIGS. 16-19 are front perspective views of various air ducts for use as part of the fan unit of FIGS. 13-15.
Figure 17:
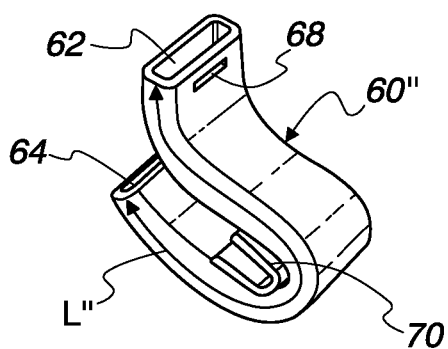

As shown in FIGS. 1-9 and as will be explained in greater detail below, the quick release mount connections 22 of this disclosure allow for the components 16, 18 and 20 to be mounted in a number of different arrangements/configurations on the helmets 11 and 12. As best seen in FIGS. 2, 3, and 7, and as will be explained in greater detail below, the fan unit 18 of this disclosure is configured to allow the fan unit 18 to be selectively utilized with safety helmets that have different brim configurations and to be compatible with the different mount arrangements and configurations allowed by the quick release mount connections 22.

As best seen in FIGS. 10-12, the power or battery pack 16 includes a battery housing 34 carrying a battery or other suitable power storage device, shown diagrammatically at 36. A battery 36 can be provided in the form of one or more suitable rechargeable or disposable battery cells, many of which are known, depending on the detailed requirements of any particular application for the system 10. In the illustrated embodiment, the battery 36 is a multi-cell, rechargeable lithium ion battery. The battery pack 16 in the illustrated embodiment further includes a pair of electric power connectors or jacks 38 that are accessible via power ports 40 formed in the housing 34, with jack caps 41 being provided to close the ports 40 when the jacks 38 are not in use to provide an intrinsic safe design. While any suitable electric power connector/jack, many of which are known, for the jacks 38, in one preferred embodiment the jacks 38 are provided in the form of USB Type-C female connections for intrinsic safe design. The illustrated embodiment of the battery pack 16 further includes a power gage 42 to visually indicate to a user how much power is available in the battery pack 16 and a user activated button 43 configured to allow a user to selectively activate the power gage 42.

As best seen in FIGS. 2, 3, 7, and 8, the fan unit 18 includes a fan housing 44 that is mountable above the brims 13 and 14 of the helmets 11 and 12, respectively. As best seen in FIG. 13, the fan housing 44 carries one or more electric motor driven fans, shown diagrammatically at 46, that can be provided in any suitable form, many of which are known. In the illustrated embodiment, there are two centrifugal or blower type fans 46, with their inlets arranged adjacent air inlets 48 formed in the fan housing 44 and their blower outlets directed into air outlet 50 formed in the fan housing 38. As best seen in FIG. 15, the fan unit 18 further includes a coiled power cord 52 extending from the housing 44 and having a suitable electric power connector 54, many of which are known, configured to form an electric power connection with either of the jacks 38 on the battery pack 16. In a preferred embodiment, the connector 54 is a USB Type-C male connection and includes a twist/screw lock member 56 that is engageable with a mating feature 58 on each of the ports 40 to releasably lock the power connectors 38 and 54 in operable engagement. The fan unit 18 further includes a user input in the form of a power button or switch 59 that is configured to allow a user to switch the fans 46 between at least an on condition wherein the fans 46 are driving a cooling air flow and an off condition wherein the fans 46 are not powered.

As best seen in FIGS. 2, 3, 7, and 8, the fan unit 18 further includes elongate, cooling air ducts 60 that are configured to direct cooling air flow (illustrated by arrows A in FIG. 2) from the fan housing 44 around the brims 13 and 14 of the helmets 11 and 12 and into the interiors of the helmets 11 and 12. As best seen in FIGS. 16-19, each of the air ducts 60 includes an duct inlet 62 to receive the cooling air flow from a corresponding one of the air outlets 50 of the fan housing 44, and an duct outlet 64 to direct the cooling air flow into the interior of the helmet 11, 12. The duct outlet 64 is spaced from the duct inlet 62 by a duct length L extending along the duct from the inlet 62 to the outlet 64. Each of the duct inlets 62 preferably has a resilient construction and is configured to have a releasable connection with the air outlets 50 of the fan housing 44 to allow the ducts 60 to be attached and detached from the fan housing 44 without the use of any tools. In the illustrated embodiments, a snap fit connection is provided by a transverse rib 66 on each of the air outlets 64 (best seen in FIGS. 13 and 15) that is engageable in a conforming transverse slot 68 provided in each of the duct inlets 62 (best seen in FIGS. 16-19), and a frictional engagement is provided between the outer surface of each of the air outlets 50 and the corresponding inner surface each of the duct inlets 62 which are sized for a snug or slight interference fit.

Figure 18:
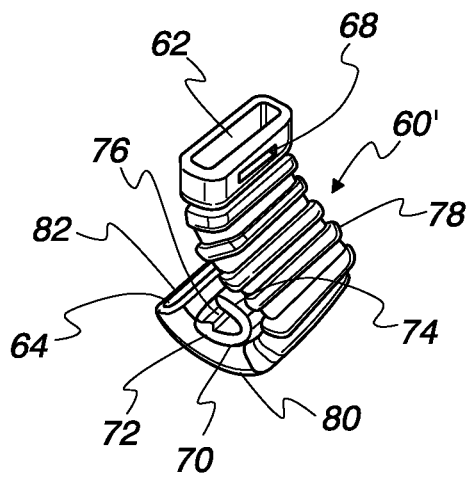
Figure 19:
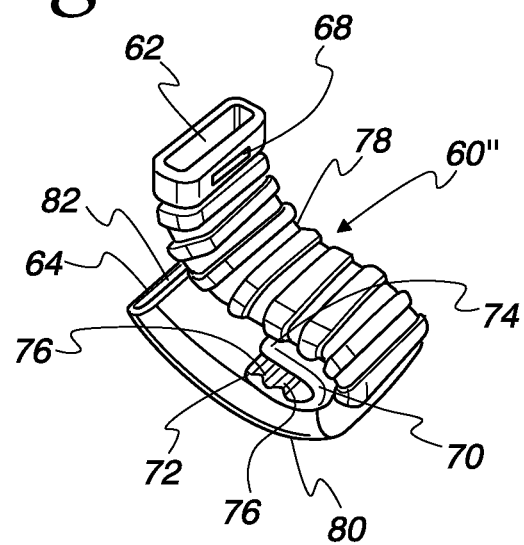

Preferably and as shown in the illustrated embodiments, each of the air ducts 60 have a flexible configuration that allows the air ducts 60 to accommodate different brim configurations. In this regard, each air duct 60, or portions of each air duct 60, can be formed from a suitable resilient material, such as a suitable polymer, or can be formed with a flexible construction, such as can be provided by a corrugated metal or polymer duct, or can be formed by a combination of such constructions and resilient material, such as can be provided by a resilient material over-molded onto a spiraling spring structure, which is a construction commonly employed in the flexible hoses of household vacuum cleaners. As best seen in FIGS. 2, 3, 5, 8 and 16-19, each duct 60 can be provided with a releasable connector 70 that is configured to provide a releasable connection with the brims 13 and 14 of the helmets 11 and 12. In the illustrated embodiments, each releasable connector 70 is provided in the form of a u-shaped, resilient snap fit connector 70 that is fixed to the duct 60 by any suitable means, including any suitable glue or bonding agent or via other types of mechanical bonding methods such as friction or heat welding. As best seen in FIGS. 18 and 19, each connector 70 has a pair of opposed legs 72 and 74 that are biased against the opposite surfaces of the brim 13, 14 when the connector 70 is engaged with the brim 13, 14, with at least one of the legs 72 having one or more barb ribs 76 to further enhance the engagement with the brim 13, 14.

As best seen in FIGS. 2, 3, 5, 8, 16, and 17, the ducts 60 can have a unitary, one-piece construction, with the exception of the connector 70 which is fixed to the unitary, one-piece ducts 60 in FIGS. 2, 3, 5, 8, 16, and 17. Alternatively, as best seen in FIGS. 18 and 19, the ducts 60 can have at least a two-piece construction, with one of the pieces being a length of flexible duct 78 having the duct inlet 62 formed therein, and the other piece being a rigid length of duct 80 having the duct outlet 64 formed therein. The pieces 78 and 80 can be formed from any suitable material and in the illustrated embodiment the piece 78 is made from a flexible polymer, such as silicon, molded with a corrugated shape along its length and the piece 80 is a molded, rigid polymer. In the illustrated embodiment, the duct outlet 64 defines a nozzle 82 to increase the velocity of the cooling air flow exiting the duct 60. The two pieces 78 and 80 can be joined by any suitable means, such a with a glue or bonding agent or via other bonding methods such as friction or heat welding. While the connector 70 is shown in FIGS. 18 and 19 as a separate component that is fixed to the duct piece 80, in some embodiments it may be desirable for the connector 70 to be formed or molded as a unitary part of the duct piece 80.

Figure 5:
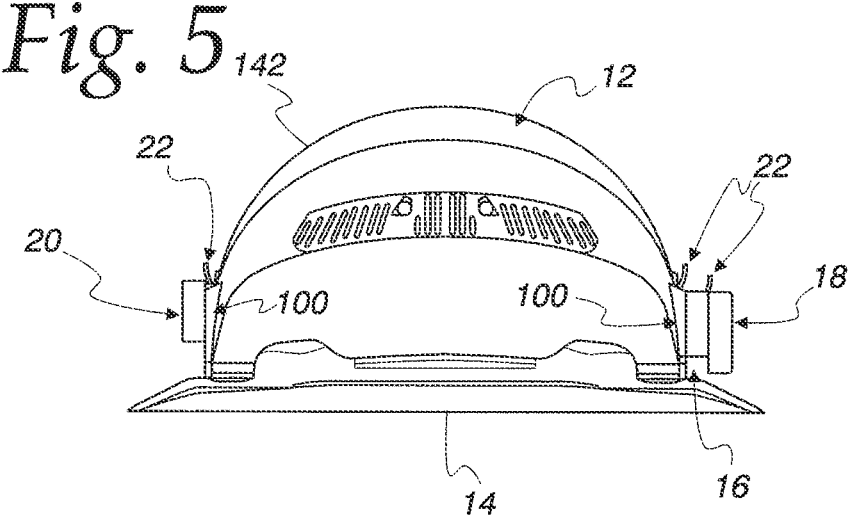
Figure 6:
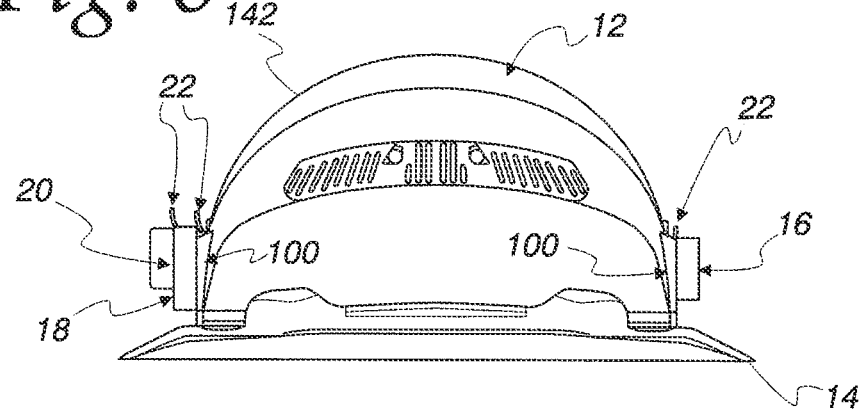

Furthermore, as illustrated by the air ducts 60' in FIGS. 2, 8, 16 and 17, and the air ducts 60" in FIGS. 3, 7, 18 and 19, the ducts 60 can be provided in at least two different sizes to accommodate different sizes of brims, with the air ducts 60" having a duct length L" that is greater than the duct length L' of the ducts 60' in order to accommodate either the larger sizes of the rear of the full style brim 14 or the bill of the cap style brim 13, or to accommodate a mount arrangement where the fan unit 18 is mounted to the battery pack 16 with the battery pack 16 being mounted to the helmet 11, 12 as shown in FIGS. 5 and 7.

Figure 21:
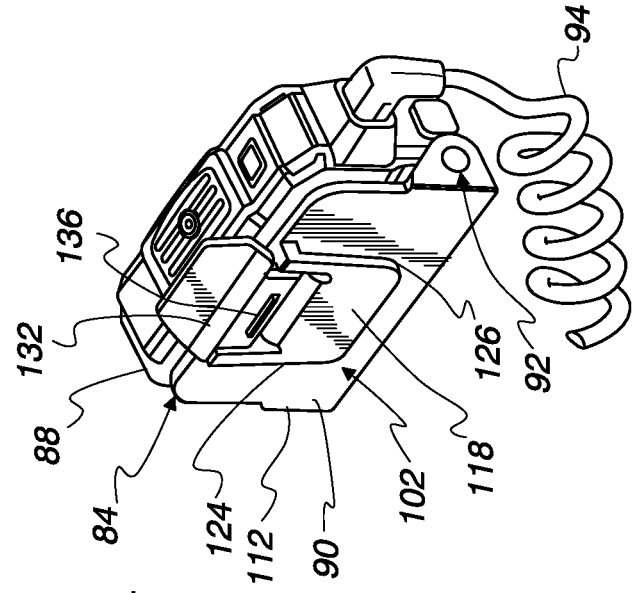
FIG. 21 is a rear perspective view of the headlamp of FIG. 20.
Figure 20:
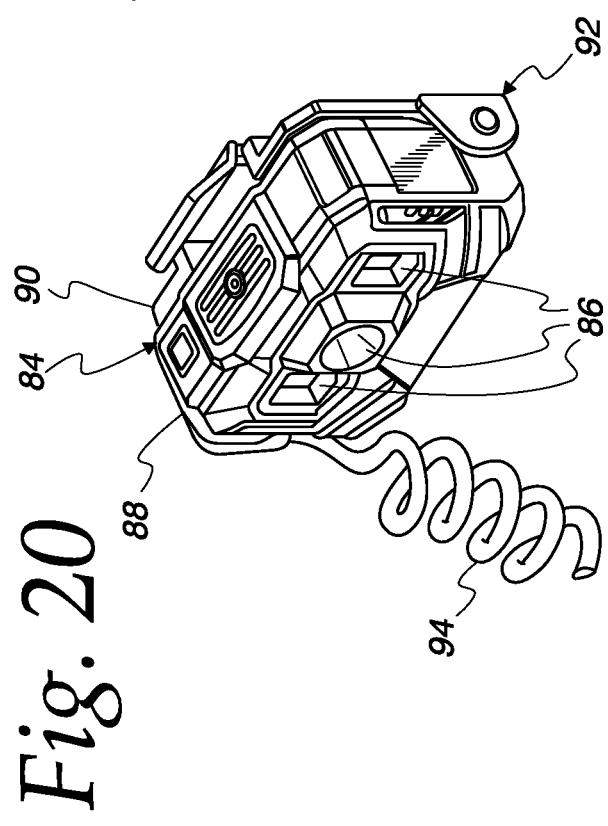
FIG. 20 is a front perspective view of a headlamp of the system of FIG. 1.
Figure 22:
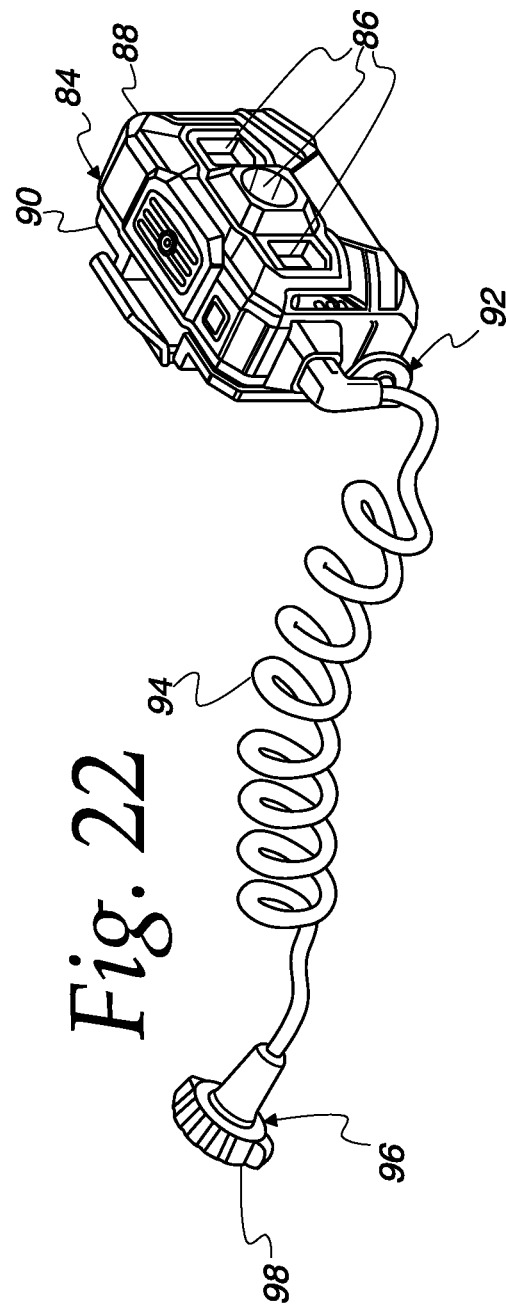
FIG. 22 is another front perspective view of the headlamp of FIGS. 20 and 21.
Figure 23:
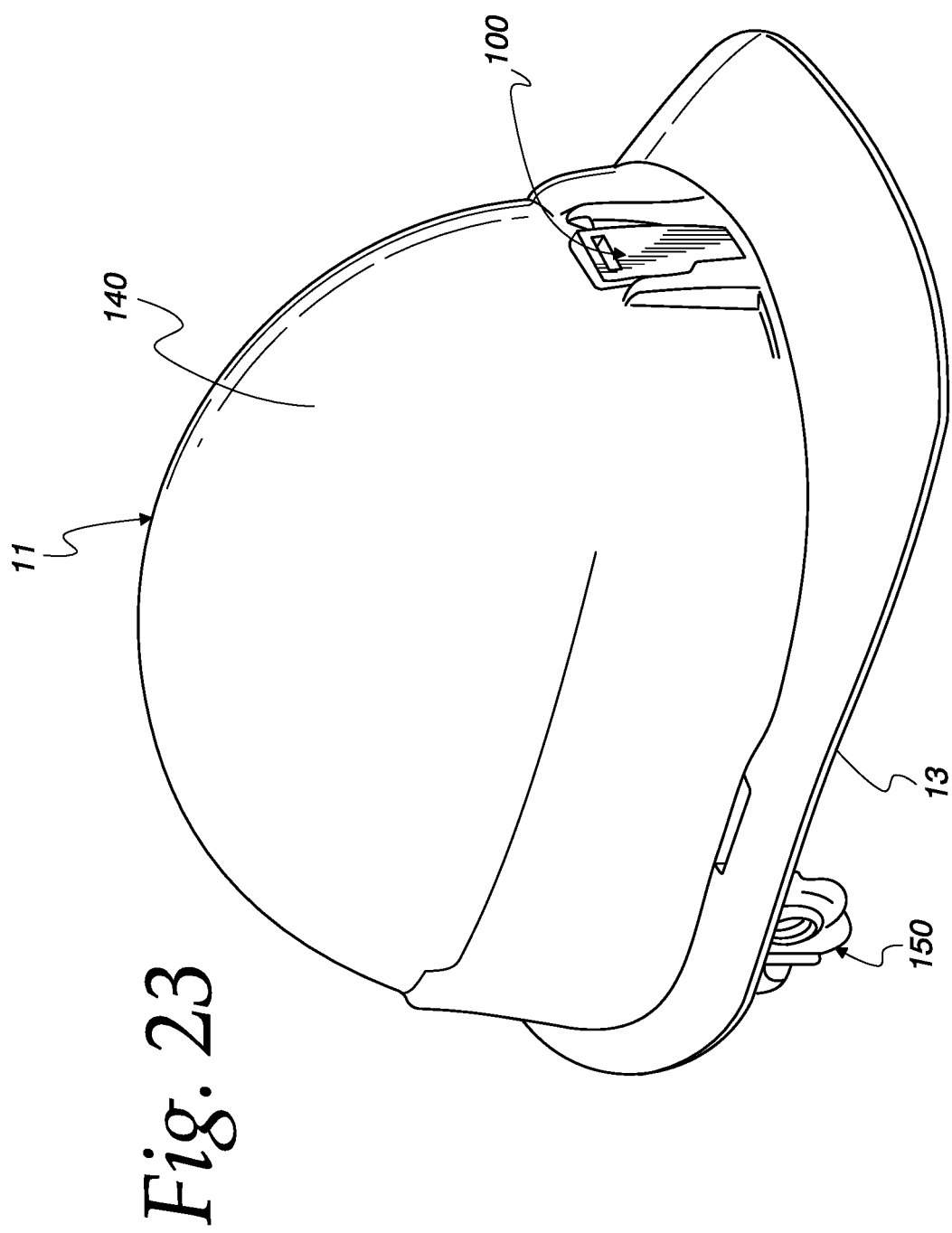
FIG. 23 is a front perspective view of the safety helmet of FIGS. 2, 7, 8, and 9.

As best seen in FIGS. 20-22, the headlamp 20 includes a housing 84 carrying one or more suitable light emitting elements 86, many of which are known. In the illustrated embodiment are three led light elements 86, with the center element 86 being configured to provide beam lighting and the two outer elements 86 being configured to provide flood lighting. In the illustrated embodiment, the housing 84 includes a main housing 88 that is pivot mounted to a mount component 90 by a pair of pivot connections 92 to allow the main housing 88 to pivot relative to the mount component 90. The head lamp 20 in the illustrated embodiment further includes a coiled power cord 94 extending from the housing 88 and having a suitable electric power connector 96, many of which are known, configured to form an electric power connection with either of the jacks 38 on the battery pack 16.

In a preferred embodiment, the connector 96 is a USB Type-C male connection and includes a twist/screw lock member 98, shown in FIG. 22, that is engageable with the mating feature 58 on each of the ports 40 to releasably lock the power connectors 38 and 96 in operable engagement. As best seen in FIG. 9, the systems 10, 30, and 32 can include one or more cord management clips 99 that are configured to provide a snap fit connection with each of the cords 52 and 94 and with each of the brims 13 and 14 so restrain the cords 52 and 94 against the safety helmets 11 and 12.

Turning now to more detail on the quick release mount connections 22 and with reference to FIGS. 11, 12, 14, and 15, both the battery housing 34 and the fan housing 44 include a pair of mount connectors 100 and 102 located on opposite faces of the housings 34 and 44, with the mount connectors 100 being located on front faces 104 and 106, respectively, of the housings 34 and 44, and the mount connectors 102 being located on back faces 108 and 110, respectively, of the housings 34 and 44. Furthermore, with reference to FIG. 21, the headlamp housing 84 also includes one of the mount connector 102 on a back face 112 of the housing 84, which in the illustrated embodiment is located on the mount component 90 of the housing 84. Each of the mount connectors 102 on the housings 34, 44, and 84 can engage with the mount connector 100 on another one of the housings 34 and 44 to provide one of the quick release mount connections 22. In this regard, in the illustrated embodiments, each of the mount connectors 100 is provided in the form of a "female" mount connector 100 and each of the mount connectors 102 is provided in the form of a "male" mount connector 102 that can be releasably engaged in any of the female mount connectors 100. In the illustrated embodiment, each of the mount connectors 100 includes a "female" feature in the form of a tapered channel 114 formed between raised sidewalls 116 (best seen in FIGS. 10 and 15), and each of the male connectors 102 includes a "male" feature in the form of a tapered clip 118 that conforms to each of the tapered channels 114 (best seen in FIGS. 12 and 14). Each tapered channel 114 is defined by an opposing pair of linear grooves 120 and 122, with the planar sides of the grooves 120 and 122 being parallel to each other and the planar bases of the grooves extending at an angle to each other. Each tapered clip 118 includes a pair of oppositely facing flanges 124 and 126 that are sized and configured to provide a conforming, sliding fit with the grooves 120 and 122, with the planar sides of the flanges 124 and 126 being parallel to each other and the planar edges of the flanges 124 and 126 extending at an angle to each other.

Preferably, releasable lock features 130 and 132 are provided on the connectors 100 and 102 to releasably lock the connectors 100 and 102 together when a connector 100 and connector 102 are fully engaged. In the illustrated embodiments, each of the lock features 130 is provided in the form of a planar shoulder 130 defined in a relief or slot 134 in the connector 100, and each of the lock features 132 is provided in the form of a cantilevered spring tab 132 having a tooth 136 that is engages the shoulder 130 when a connector 102 is fully inserted into one of the connectors 100. A user can disengage the tooth 136 from the shoulder 130 by manually actuating the tab 132 away from the shoulder 130 to release the connectors 100 and 102 from a fully engaged and locked condition.

In the illustrated embodiments, the above described features of each of the connectors 100 and 102 are formed as unitary parts of each of the corresponding housings 34, 44, and 84. However, it should be understood that portions of the connectors 100 or 102, or an entire connector 100 or 102, could be formed as a separate component that is then fixed to the remainder of the corresponding housing 34, 44, and 84. For example, in some applications it may be desirable to form the spring tab 132 or the clip 118 or both as a separate component that is then fixed to the corresponding housing 34, 44, and 84.

As best seen in FIGS. 2 and 3, each of the safety helmets 11 and 12 includes a hard outer shell 140 and 142, respectively, designed to protect the head of a user from injury. As best seen in FIG. 9, the shell 140 includes the brim 13 extending around the entire bottom of the shell 140, with the brim 13 including a forwardly extending bill 146 designed to shield the user's eyes from sunlight or falling debris. This type of shell is commonly referred to as a "cap" style shell. As best seen in FIGS. 3-6, the shell 142 includes the brim 14 that extends outwardly around the entire bottom of the shell 22 to protect the user's eyes, ears and neck from sunlight and falling debris. This type of shell is commonly referred to as a "full brim" style shell. As seen in FIGS. 2, 3, and 7-9, both safety helmets 11 and 12 include a suspension system 150 for suspending the shells 140 and 142 in spaced relation to a user's head. It should be understood that the specific forms of the shells 140 and 142 and the suspension systems 150 shown in the figures of this disclosure are for purposes of illustration and that there are many suitable and known constructions for such shells and suspension systems for safety helmets which may be utilized with the components 16, 18 and 20 disclosed herein. In this regard, while two specific types of brim configurations are disclosed herein, it should be understood that the fan unit 18 can be adapted for use with any type of brim configuration. In the illustrated and preferred embodiments, the safety helmets 11 and 12 are hard hats, and in a highly preferred embodiment, the helmets are configured to satisfy the requirements set forth in ANSI/ISEA Z89.1-2014 and/or CSA Z94.1-15, either TYPE I or II, and any or all of Classes C, E, & G.

As seen in FIGS. 1, 4-6, and 23, each of the shells 140 and 142 have a pair of the mount connectors 100 located on the front and back of the shell to form a quick release mount connection 22 with each of the connectors 102 on the components 16, 18, and 20 of the system 10. In the illustrated embodiments, the connectors 100 are molded as unitary part of each shell 140 and 142 so that they form a one-piece, unitary construction with the remainder of each shell 140 and 142. It should be understood that in some cases, it may be desirable to include each of the helmets 11 and 12, or each of the shells 140 and 142, as part of one or more of the systems 10, 30, or 32. Helmets having a similar construction, including having integrated mount connectors, are disclosed in U.S. patent application Ser. No. 16/246,935 filed on Jan. 14, 2019, the entire disclosure of which is hereby incorporated by reference.

Preferred embodiments of the inventive concepts are described herein, including the best mode known to the inventor(s) for carrying out the inventive concepts. Variations of those preferred embodiments will become apparent to those of ordinary skill in the art upon reading the foregoing description. The inventor(s) expect skilled artisans to employ such variations as appropriate, and the inventor(s) intend that the inventive concepts can be practiced otherwise than as specifically described herein. Accordingly, the inventive concepts disclosed herein include all modifications and equivalents of the subject matter recited in the claims appended hereto as permitted by applicable law. Moreover, any combination of the above-described elements and features in all possible variations thereof is encompassed by the inventive concepts unless otherwise indicated herein or otherwise clearly contradicted by context. Further in this regard, while highly preferred forms of the systems 10, 30, and 32 are shown in the figures, it should be understood that this disclosure anticipates variations in the specific details of each of the disclosed components and features of the systems 10, 30, and 32 and that no limitation to a specific form, configuration, or detail is intended unless expressly and specifically recited in an appended claim.

For example, while specific and preferred forms have been shown for the connectors 100 and 102, in some applications, other forms of connectors that provide a quick release mount connection may be desirable. As an example, a bayonet type mount connection may be desirable in some applications, while a side release type connection such as commonly employed on buckles for webbing straps may be desirable in other applications. As another example, in some applications it may be desirable for the connector 100 to utilize a single groove 120 and for the connector 102 to utilize a single flange 124. In a further example, in some applications it may be desirable for the channels 114 and clips 118 to be straight (un-tapered) rather than the tapered shapes illustrated drawings. As yet a further example, it may be desirable for the spring tab 132 to include a semi-spherical bump that is engages in a semi-spherical recess in the connector 100 rather than the tooth 136 that engages the shoulder 130. Similarly, in some applications, it may be desirable for the connectors 100 and 102 to substitute a spring loaded, ball detent and corresponding relief for the spring tab 132 and shoulder 130. In yet another example, while the connectors 100 and 102 are shown as being centered on each of the corresponding housings 34, 44, and 84, in some applications it may be desirable to for the connectors 100 and 102 to have other locations or orientations, such as an offset location, on one or more of the housings 34, 44, and 84. Similarly, while the connectors 100 are shown in specific locations on each of the shells 140 and 142, in some applications it may be desirable for the connectors 100 to be located elsewhere on the shells 140 and 142, or for more than two of the connectors 100 to be provided on the shells 140 and 142. Additionally, in some applications it may be desirable for the male connectors 102 to be substituted for one or both of the female connectors 100 shown on each of the shells 140 and 142. Similarly, while the female connectors and features 100 and 114 have been shown on the front faces 104 and 106 of the housings 34 and 44 and the male connectors and features 102 and 118 have been shown on the back faces 108, 110, and 112 of the housings 34, 44, and 84, in some applications it may be desirable for the female connector and features 100 and 114 to be provided on the back faces 108, 110 and 112 and for the male connectors and features 100 and 118 to be provided on the front faces 104 and 106.

As a further example related to the fan unit 18, while in most applications it will desirable for the cooling air ducts 60' and 60" to be flexible, in some applications it may be desirable for the ducts 60' and 60" to be rigid. Furthermore, while the ducts 60 are shown with rectangular cross-sections that are transverse to the cooling air flow, other cross-sections, such as square, circular, or trapezoidal, may have advantages in certain applications. As another example, while the fan unit 18 is shown as including two motor driven fans 46, in some applications it may be desirable to include a single fan 46 or more than two fans 46. Additionally, while the fan unit 18 is shown as utilizing two of the ducts 60, in some applications it may be desirable to for the fan unit 18 to be configured for use with a single duct 60, or alternatively, to be configured for more than two ducts 60. Furthermore, while "blower" type fans 46 are shown, other types of fans, including axial fans, may be more desirable in some applications.

As an example related to the battery pack 16, while two electrical power connectors 38 are illustrated, in some applications it may be desirable for the battery pack 16 to include more than two or less than two of the connectors 38. As another example, while the connectors 38 are shown as being symmetrically located on top of the battery pack 16 with an upwardly opening orientation, other locations and orientations may be desirable for some applications.

As an example related to the headlamp 20, while the illustrated headlamp includes three light emitting elements 86, in some applications it may be desirable for the headlamp to include more or fewer light emitting elements 86. Furthermore, while the illustrated housing 84 is shown as including the mount component 90 pivot mounted to the main housing 88, in some applications it may be desirable for the component 90 to either be eliminated or for other types of articulated components to be utilized.

Another example is provided by the housings 34, 44 and 84, each of which is shown in one preferred form and configuration, but all of which can take on any suitable form and configuration depending upon the specifics of each intended application. For example, it may be desirable for the fan housing to have a significantly different form and configuration if an axial type fan is utilized instead of the illustrated blower type fan, or if only a single fan is utilized instead of the two illustrated fans, or if it is desired for the fan not to be fully enclosed as shown in the illustrated embodiments. Furthermore, it should be understood that as used herein, the term "housing" is intended to cover any structure, including any frame type structure, that can carry its associated device for mounting in the systems 10, 30 and 32, As a further example related to the system 10, while the system 10 has been shown as including three specific components 16, 18 and 20, in some applications it may be desirable for the system 10 to include additional and/or different components that include either the connector 100 or the connector 102 or both connectors 100 and 102, or to include different components than those specifically disclosed. For example, it may be desirable for the system 10 to include a wireless communication unit, a gas detector, and/or a video camera. Furthermore, while the disclosed components are powered components, it may be desirable to utilize the connectors 100 and 102 and/or their arrangement on opposing faces of a housing to mount two or more components/accessories that are not powered by a battery or other power source.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the inventive concepts disclosed herein and does not pose a limitation on the scope of any invention unless expressly claimed. No language in the specification should be construed as indicating any non-claimed element as essential to the practice of the inventive concepts disclosed herein.

All references, including publications, patent applications, and patents, cited herein are hereby incorporated by reference to the same extent as if each reference were individually and specifically indicated to be incorporated by reference and were set forth in its entirety herein.

What is claimed is:

1. A safety helmet fan system comprising:
   a motor driven fan;
   a fan housing carrying the motor driven fan, the fan housing having a pair of opposing faces, a first connector located on one of the opposing faces and a second connector located on the other of the opposing faces;
   a battery to power the motor driven fan; and
   a battery housing carrying the battery, the battery housing having a pair of opposing faces, a first connector located on one of the opposing faces of the battery housing and a second connector located on the other of the opposing faces of the battery housing; wherein the first connectors are configured to be compatible with the second connectors to provide quick release mount connections between the fan housing and battery housing on each of their opposing faces.

2. The safety helmet fan system of claim 1 wherein the first connectors are configured to be compatible with one or more mount connectors on a safety helmet to provide quick release mount connections between the housings and the safety helmet.

3. The safety helmet fan system of claim 1 further comprising a safety helmet shell having a pair of mount connectors, each mount connector configured to receive either of the first connectors to provide quick release mount connections between the safety helmet shell and the housings.

4. The safety helmet fan system of claim 1 wherein each of the first connectors comprises a male feature and each of the second connectors comprises a female feature configured to receive the male feature.

5. The safety helmet fan system of claim 4 wherein either each of the first connectors or each of the second connectors comprises a spring tab with a lock feature that is engageable with a mating lock feature to restrict relative movement between the connectors when a male feature is engaged with a female feature.

6. The safety helmet fan system of claim 5 wherein the lock feature is a tooth and the mating lock feature is a shoulder configured to engage the tooth.

7. A safety helmet fan system comprising:
   a motor driven fan;
   a fan housing carrying the motor driven fan, the fan housing having a male mount connector and a female mount connector located on opposing faces of the fan housing;
   a battery,
   a battery housing carrying the battery, the battery housing having a male mount connector and a female mount connector located on opposing faces of the battery housing, wherein the male mount connectors are configured to be compatible with the female mount connectors to provide quick release mount connections between the fan housing and the battery housing on each of their opposing faces.

8. The safety helmet fan system of claim 7 wherein at least one of the male mount connectors or the female mount connector are configured to be compatible with one or more mount connectors on a safety helmet to provide quick release mount connections between the housings and the safety helmet.

9. The safety helmet fan system of claim 7 further comprising a safety helmet shell having a pair of mount connectors, each mount connector on the safety helmet shell configured to receive at least one of the male mount connectors or female mount connectors to provide quick release mount connections between the safety helmet shell and the housings.

10. The safety helmet fan system of claim 7 wherein each of the male mount connectors comprises a spring tab with a lock feature that is engageable with a mating lock feature on each of the female mount connectors to restrict relative movement between the mount connectors when a male mount connector is engaged with a female mount connector.

11. The safety helmet fan system of claim 10 wherein the lock feature is a tooth and the mating lock feature is a shoulder configured to engage the tooth.

12. The safety helmet fan system of claim 7 wherein each of the male mount connectors comprises a flange and each of the female mount connectors comprises a groove configured to receive the flange.

13. The safety helmet fan system of claim 7 wherein each of the male mount connectors comprises a pair of oppositely directed flanges and each of the female mount connectors comprises a pair of grooves, each groove configured to receive one of the flanges.

14. A multiple component, battery powered system for mounting on a safety helmet, the system comprising:
a battery housing carrying a battery;
a first component housing carrying a first component that can be powered by the battery; and
a second component housing carrying a second component that can be powered by the battery; wherein:
the battery housing has a male mount connector and a female mount connector located on opposing faces of the battery housing,
the first component housing has a male mount connector and a female mount connector located on opposing faces of the first component housing,
the second component housing has at least one of a male mount connector or a female mount connector, and
the male mount connectors are configured to be compatible with the female mount connectors to provide quick release mount connections between the housings.

15. The multiple component, battery powered system of claim 14 wherein at least one of the male mount connectors or the female mount connectors are configured to be compatible with one or more mount connectors on a safety helmet to provide quick release mount connections between the housings and the safety helmet.

16. The multiple component, battery powered system of claim 14 further comprising a safety helmet shell having a pair of mount connectors, each mount connector on the safety helmet shell configured to receive at least one of the male mount connectors or female mount connectors to provide quick release mount connections between the safety helmet shell and the housings.

17. The multiple component, battery powered system of claim 14 wherein each of the male mount connectors or each of the female mount connectors comprises a spring tab with a lock feature that is engageable with a mating lock feature to restrict relative movement between the mount connectors when a male mount connector is engaged with a female mount connector.

18. The multiple component, battery powered system of claim 14 wherein each of the male mount connectors comprises a flange and each of the female mount connectors comprises a groove configured to receive the flange.

19. A multiple component, battery powered system for mounting on a safety helmet, the system comprising:
a battery housing carrying a battery; and
a first component housing carrying a first component that can be powered by the battery; wherein:
the battery housing has a first mount connector and a second mount connector located on opposing faces of the battery housing,
the first component housing has a first mount connector and a second mount connector located on opposing faces of the first component housing, and
the first mount connectors are configured to be compatible with the second mount connectors to provide quick release mount connections between the housings.

20. The multiple component, battery powered system of claim 19 further comprising a second component housing carrying a second component that can be powered by the battery; the second component housing having a first mount connector configured to be compatible with the second mount connectors to provide quick release mount connections between the housings.

21. The multiple component, battery powered system of claim 20 wherein the first mount connectors are male mount connectors and the second mount connectors are female mount connectors.

22. The multiple component, battery powered system of claim 19 further comprising a safety helmet shell having a pair of mount connectors, each mount connector configured to receive either of the first connectors to provide quick release mount connections between the safety helmet shell and the housings.

23. The multiple component, battery powered system of claim 14 wherein the first component comprises a motor driven fan.

24. The multiple component, battery powered system of claim 19 wherein the first component comprises a motor driven fan.

* * * * *